United States Patent Office 3,700,585
Patented Oct. 24, 1972

3,700,585
DEWAXING OF OILS BY SHAPE SELECTIVE CRACKING AND HYDROCRACKING OVER ZEOLITES ZSM-5 AND ZSM-8
Nai Yuen Chen, Hopewell Township, Mercer County, Stanley J. Lucki, Runnemede, and William E. Garwood, Haddonfield, N.J., assignors to Mobil Oil Corporation
No Drawing. Filed Oct. 10, 1969, Ser. No. 865,470
Int. Cl. C10g 13/02, 11/02
U.S. Cl. 208—111
11 Claims

ABSTRACT OF THE DISCLOSURE

Straight-chain hydrocarbons and slightly branched-chain hydrocarbons are selectively converted utilizing novel crystalline zeolites having unique molecular sieving properties. The catalyst preferably contains acidic cations and can also contain a component having a hydrogenation/dehydrogenation function. The process of this invention is particularly useful for the dewaxing of hydrocarbon oils including removal of high freezing point paraffins from jet fuel to lower freezing, as well as improving the octane rating of naphtha fractions.

RELATED APPLICATIONS

This application is related to application Ser. No. 865,-472, filed Oct. 10, 1969, and application Ser. No. 865,-418, filed Oct. 10, 1969, which are directed to ZSM-5 and ZSM-8 type aluminosilicates respectively.

BACKGROUND OF THE INVENTION (1) Field of the invention

This invention relates to novel dewaxing processes carried out in the presence of crystalline zeolitic material and, more particularly, to the removal of straight-chain paraffins and slightly branched-chain paraffins from hydrocarbon feedstocks by selectively converting these materials from a mixture of the same with the other components generally found in hydrocarbon feedstocks.

(2) Description of the prior art

Hydrocarbon conversion processes utilizing crystalline zeolites and, in particular, aluminosilicate catalysts have been the subject of extensive investigation during recent years as is obvious from both the patent and scientific literature. Crystalline aluminosilicates have been found to be particularly effective for a wide variety of hydrocarbon conversion processes and have been described and claimed in many patents including U.S. Pats. 3,140,249; 3,140,252; 3,140,251; 3,140,253; and 3,271,418. Aside from serving as general catalysts in hydrocarbon conversion processes, it is also known that the molecular sieve properties of zeolites can be utilized to preferentially convert one molecular species from a mixture of the same with other species.

In a process of this type a zeolite molecular sieve is employed having catalytic activity within its internal pore structure and pore openings such that one component of a feed is capable of entering within the internal pore structure thereof and being converted to the substantial exclusion of another component which, because of its size, is incapable of entering within the pores of the zeolitic material. Shape selective catalytic conversion is also known in the art and is disclosed and claimed in U.S. Pats. 3,140,-322; 3,379,640 and 3,395,094.

Although a wide variety of zeolitic materials and particularly crystalline aluminosilicates have been successfully employed in various catalytic conversion processes, neverthelesss, these prior art processes, in general, fell into one or two main categories. In one type of conversion process a zeolite was employed which had a pore size sufficiently large to admit the vast majority of components normally found in a charge, i.e., these materials are referred to as large pore size molecular sieves and they are generally stated to have a pore size of from 6 to 13 angstroms and are represented by zeolites X, Y and L. The other type of aluminosilicate was one which had a pore size of approximately 5 angstrom units and it was utilized to preferentially act upon normal paraffins to the substantial exclusion of other molecular species. Thus, by way of considerable over-simplification up until the present invention, there were only two types of aluminosilicates which were available for hydrocarbon processing—those which would admit only normal paraffins and those which would admit all components normally present in a hydrocarbon feed charge.

DESCRIPTION OF THE INVENTION

It has now been discovered that very effective catalytic operations can be carried out by utilizing a class of zeolitic molecular sieves which possess unique sieving properties in that they allow entry and egress to their internal pore structure of not only normal paraffins but also of slightly branched paraffins, and yet have the ability to exclude heavily branched isoparaffins. Thus, it is now possible to carry out hydrocarbon conversion processes which are not only selective towards normal paraffins, but also are selective towards slightly branched paraffins and, in particular, monomethyl-substituted paraffins. It has now been discovered that when zeolitic materials exhibiting these properties are employed in those dewaxing operations where it has been heretofore desirous only to selectively remove normal paraffins that many increased and unexpected benefits will occur in that the resulting products have enhanced economic value.

As has heretofore been stated, all the crystalline aluminosilicate materials heretofore employed in prior art processes fell into one of two general types. They either have pore sizes of about 5 angstrom units or have pore sizes from about 6 to about 15 angstrom units. The 5 angstrom unit aluminosilicates were generally stated to be shape selective in that they allowed selective conversion of normal aliphatic compounds from a mixture of the same with isoaliphatic compounds and cyclic compounds. The second type of aluminosilicate, i.e., those having a pore size of 6 to 15 angstrom units were generally stated to be nonselective, i.e., substantially all of the molecules normally found in a hydrocarbon feed stream are able to enter within the internal pore structure of the zeolites and be converted. Thus, heretofore a very convenient method of identifying a good shape selective catalyst was to show that it would selectively crack normal hexane from a mixture of the same with 2-methyl pentane since the former was able to enter its internal pore structure, whereas the latter isocompound was unable to do so.

The novel dewaxing process of this invention is predicated upon using zeolitic materials which can generally be stated to be intermediate between the two types of aluminosilicates heretofore employed. Thus, catalysts of this invention will allow the entry into their internal pore structure of normal aliphatic compounds and slightly branched aliphatic compounds, particularly monomethyl-substituted compounds, yet substantially exclude all compounds containing at least a quaternary carbon atom or having a molecular dimension equal to or substantially greater than a quaternary carbon atom. Additionally, aromatic compounds having side chains similar to the normal aliphatic compounds and slightly branched aliphatic compounds above described could have said side chains enter the internal pore structure of the instant catalysts. Thus, if one were to measure the selectivity of the zeolitic materials employed in the processes of this invention by the heretofore mentioned prior art test, i.e., the ability to selectively crack hexane from a mixture of the same with isohexane, these catalysts would have to be stated as being non-shape selective. It should be immediately apparent, however, that the term selectivity has a far greater significance than merely the ability to preferentially distinguish between normal paraffins and isoparaffins. Selectivity on shape is theoretically possible at any shape or size although, quite obviously, such selectivity might not result in an advantageous catalyst for any and all hydrocarbon conversion processes.

The novel dewaxing processes of this invention are based upon the fact that, although it is art-recognized that in the vast majority of refinery operations it is desirous to preserve aromatics and to remove normal paraffins, nevertheless, such a generalization is not the final word in obtaining maximum yields of economically enhanced products. It has now been discovered that enhanced benefits can be obtained if a catalyst system could be designed which would not only selectively convert normal paraffins, but certain isoparaffins, and yet not affect desirable components in a given feedstock. This type of molecular processing or sieving was heretofore unknown. As has been stated, all the previous catalytic processing involving the use of zeolitic molecular sieves merely gave the operator two choices. He could either use a molecular sieve which was a catalyst of generalized competence, i.e., it would act upon substantially all of the molecules normally found in a hydrocarbon feed or he could use a catalyst which had a pore size of about 5 angstrom units thereby allowing selective conversion of normal aliphatic compounds only.

While not wishing to be bound by any theory of operation, nevertheless, it appears that the crystalline zeolitic materials employed in the instant invention cannot simply be characterized by the recitation of a pore size or a range of pore sizes. It would appear that the uniform pore openings of this new type of zeolite are not circular in nature, as is usually the case in the heretofore employed zeolites, but rather, are elliptical in nature. Thus, the pore openings of the instant zeolitic materials have both a major and a minor axes, and it is for this reason that the unusual and novel molecular sieving effects are achieved. This elliptical shape can be referred to as a "keynote." It would appear that the minor axis of the elliptical pores in the zeolites apparently have an effective size of about 5.5 angstrom units. The major axis appears to lie somewhere between 6 and about 9 angstrom units. The unique keyhole molecular sieving action of these materials is presumably due to the presence of these elliptically shaped windows controlling access to the internal crystalline pore structure.

A test method has been devised in order to determine whether or not a zeolite possesses the unique molecular sieving properties necessary to carry out the novel conversion process of this invention. In said test method a candidate zeolite free from any matrix or binder is initially converted to the so-called acid or hydrogen form. This procedure involves exhaustive exchange with an ammonium chloride solution in order to replace any metallic cations originally present. The sample is then sized to 20–30 mesh and calcined in air for 16 hours at 550° C. One gram of the so-treated zeolite is then contacted with benzene at a pressure of twelve torr at a temperature of 25° C. for a time period of two hours. Another gram sample is contacted with mesitylene at a pressure of 0.5 torr at a temperature of 25° C. for a period of six hours. An operable zeolite is one whose acid form will absorb at least 3.0 weight percent benzene and less than 1.5 weight percent mesitylene at the above recited conditions.

Examples of zeolitic materials which are operable in the process of this invention are ZSM–5 type and ZSM–8 type zeolites. ZSM–5 type materials are disclosed and claimed in copending application Ser. No. 865,472 filed Oct. 10, 1969 and ZSM–8 is disclosed and claimed in copending application Ser. No. 865,418, filed Oct. 10, 1969.

The family of ZSM–5 compositions has the characteristic X-ray diffraction pattern set forth in Table 1, hereinbelow. ZSM–5 compositions can also be identified, in terms of mole ratios of oxides, as follows:

$$0.9 \pm 0.2\ M_{2/n}O:W_2O_3:5\text{--}100\ YO_2:zH_2O$$

wherein M is a cation, $n$ is the valence of said cation, W is selected from the group consisting of aluminum and gallium, Y is selected from the group consisting of silicon and germanium, and $z$ is from 0 to 40. In a preferred synthesized form, the zeolite has a formula, in terms of mole ratios of oxides, as follows:

$$0.9 \pm 0.2\ M_{2/n}O:Al_2O_3:5\text{--}100\ SiO_2:zH_2O$$

and M is selected from the group consisting of a mixture of alkali metal cations, especially sodium, and tetraalkylammonium cations, the alkyl groups of which preferably contain 2–5 carbon atoms.

In a preferred embodiment of ZSM–5, W is aluminum, Y is silicon and the silica/alumina mole ratio is at least 10 and ranges up to about 60.

Members of the family of ZSM–5 zeolites possess a definite distinguishing crystalline structure whose X-ray diffraction pattern shows the following significant lines:

TABLE 1

| Interplanar spacing $d$(A): | Relative intensity |
|---|---|
| 11.1±0.2 | S |
| 10.0±0.2 | S |
| 7.4±0.15 | W |
| 7.1±0.15 | W |
| 6.3±0.1 | W |
| 6.04±0.1 | W |
| 5.97±0.1 | W |
| 5.56±0.1 | W |
| 5.01±0.1 | W |
| 4.60±0.08 | W |
| 4.25±0.08 | W |
| 3.85±0.07 | VS |
| 3.71±0.05 | S |
| 3.64±0.05 | M |
| 3.04±0.03 | W |
| 2.99±0.02 | W |
| 2.94±0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_0$, where $I_0$ is the intensity of positions as a function of 2 times theta, where theta is the Bragg angle, were read from the spectrometer chart. From these, the relative intensities, 100 $I/I_0$, where $I_0$ is the intensity of the strongest line or peak, and $d$ (obs.), the interplanar spacing in A, corresponding to the recorded lines, were calculated. In Table 1 the relative intensities are given in terms of the symbols S=strong, M=medium, MS=medium strong, MW=medium weak and VS=very strong. It should be understood that this X-ray diffraction pattern is characteristic of all the species of ZSM–5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM–5 have been prepared. X-ray powder diffraction patterns of several of these forms are set forth below. The ZSM–5 forms set forth below are all aluminosilicates.

TABLE 2.—X-RAY DIFFRACTION

ZSM-5 Powder in Cation Exchanged Forms d Spacings Observed

| As made | HCl | NaCl | CaCl₂ | ReCl₃ | AgNO₃ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
|  |  | 9.01 |  | 9.02 | 9.01 |
| 8.06 |  |  |  |  | 8.99 |
| 7.44 | 7.46 | 7.46 | 7.46 | 7.40 | 4.46 |
| 7.08 | 7.07 | 7.09 | 7.11 |  | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 |  | 5.38 | 5.37 | 5.38 | 5.37 |
| 5.13 | 5.11 | 5.14 | 5.12 | 5.14 |  |
| 4.99 | 5.01 | 5.01 | 5.01 | 5.01 | 5.01 |
|  |  | 4.74 |  |  |  |
| 4.61 | 4.62 | 4.62 | 4.61 | 4.63 | 4.62 |
|  |  | 4.46 | 4.46 |  | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 |  |  | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
|  | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 |  |  | 3.17 | 3.18 |  |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
|  |  |  |  | 2.97 |  |
|  | 2.95 | 2.95 | 2.94 | 2.95 | 2.95 |
| 2.86 | 2.87 | 2.87 | 2.87 | 2.87 | 2.87 |
| 2.80 |  |  |  |  |  |
| 2.78 |  |  | 2.78 |  | 2.78 |
| 2.73 | 2.74 | 2.74 | 2.73 | 2.74 | 2.74 |
| 2.67 |  |  | 2.68 |  |  |
| 2.66 |  |  | 2.65 |  |  |
| 2.60 | 2.61 | 2.61 | 2.61 | 2.61 | 2.61 |
|  | 2.59 |  | 2.59 |  |  |
| 2.57 |  | 2.57 | 2.56 |  | 2.57 |
| 2.50 | 2.52 | 2.52 | 2.52 | 2.52 |  |
| 2.49 | 2.49 | 2.49 | 2.49 | 2.49 | 2.49 |
|  |  |  | 2.45 |  |  |
| 2.41 | 2.42 | 2.42 | 2.42 | 2.42 |  |
| 2.39 | 2.40 | 2.40 | 2.39 | 2.40 | 2.40 |
|  |  |  | 2.38 | 2.35 | 2.38 |
|  | 2.33 |  | 2.33 | 2.32 | 2.33 |
|  | 2.30 |  |  |  |  |
|  | 2.24 | 2.23 | 2.23 |  |  |
|  | 2.20 | 2.21 | 2.20 | 2.20 |  |
|  | 2.18 | 2.18 |  |  |  |
|  |  | 2.17 | 2.17 | 2.17 |  |
|  | 2.13 |  | 2.13 |  |  |
|  | 2.11 | 2.11 |  | 2.11 |  |
|  |  |  | 2.10 | 2.10 |  |
|  | 2.08 | 2.08 |  | 2.08 | 2.08 |
|  |  | 2.07 | 2.07 |  |  |
|  |  |  | 2.04 |  |  |
| 2.01 | 2.01 | 2.01 | 2.01 | 2.01 | 2.01 |
| 1.99 | 2.00 | 1.99 | 1.99 | 1.99 | 1.99 |
|  |  |  | 1.97 | 1.96 |  |
| 1.95 | 1.95 | 1.95 | 1.95 | 1.95 |  |
|  |  |  |  | 1.94 |  |
|  | 1.92 | 1.92 | 1.92 | 1.92 | 1.92 |
| 1.91 |  |  |  | 1.91 |  |
|  |  |  |  | 1.88 |  |
| 1.87 | 1.87 | 1.87 | 1.87 | 1.87 | 1.87 |
|  | 1.86 |  |  |  |  |
| 1.84 | 1.84 |  |  | 1.84 | 1.84 |
| 1.83 | 1.83 | 1.83 | 1.83 | 1.83 |  |
| 1.82 |  | 1.81 |  | 1.82 |  |
| 1.77 | 1.77 | 1.79 | 1.78 |  | 1.77 |
| 1.76 | 1.76 | 1.76 | 1.76 | 1.76 | 1.76 |
|  |  | 1.75 |  |  | 1.75 |
|  | 1.74 | 1.74 | 1.73 |  |  |
| 1.71 | 1.72 | 1.72 | 1.71 |  | 1.70 |
| 1.67 | 1.67 | 1.67 |  | 1.67 | 1.67 |
| 1.66 | 1.66 |  | 1.66 | 1.66 | 1.66 |
|  |  | 1.65 | 1.65 |  |  |
|  |  | 1.64 | 1.64 |  |  |
|  | 1.63 | 1.63 | 1.63 | 1.63 | 1.62 |
|  | 1.61 | 1.61 | 1.61 |  | 1.61 |
| 1.58 |  |  |  |  |  |
|  | 1.57 | 1.57 |  | 1.57 | 1.57 |
|  |  | 1.56 | 1.56 | 1.56 |  |

Zeolite ZSM-5 can be suitably prepared by preparing a solution containing tetrapropyl ammonium hydroxide, sodium oxide, an oxide of aluminum or gallium, an oxide of silica or germanium, and water and having a composition, in terms of mole ratios of oxides, falling within the following ranges:

TABLE 3

|  | Broad | Preferred | Particularly preferred |
|---|---|---|---|
| OH⁻/SiO₂ | 0.07–1.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum or gallium and Y is silicon or germanium maintaining the mixture until crystals of the zeolite are formed. Thereafter, the crystals are separated from the liquid and recovered. Typical reaction conditions consist of heating the foregoing reaction mixture to a temperature of from about 150° C. to 175° C. for a period of time of from about six hours to 60 days. A more preferred temperature range is from about 160 to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F., for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, in terms of mole ratios of oxides, as follows:

$$0.9 \pm 0.2 \ M_{2/n}O : Al_2O_3 : 5\text{–}100 \ SiO_2 : zH_2O$$

wherein M is at least one cation, $n$ is the valence thereof and $z$ is from 0 to 40. In a preferred synthesized form, the zeolite has a formula, in terms of mole ratios of oxides, as folows:

$$0.9 \pm 0.2 \ M_{2/n}O : Al_2O_3 : 10\text{–}60 \ SiO_2 : zH_2O$$

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| dA. | I/I₀ | dA. | I/I₀ | dA. | I/I₀ | dA. | I/I₀ |
|---|---|---|---|---|---|---|---|
| 11.1 | 46 | 4.35 | 7 | 3.04 | 10 | 2.32 | 1 |
| 10.0 | 42 | 4.25 | 18 | 2.99 | 6 | 2.28 | 1 |
| 9.7 | 10 | 4.07 | 20 | 2.97 | 4 | 2.23 | 1 |
| 9.0 | 6 | 4.00 | 10 | 2.94 | 3 | 2.20 | 1 |
| 7.42 | 10 | 3.85 | 100 | 2.86 | 2 | 2.17 | 1 |
| 7.06 | 7 | 3.82 | 57 | 2.78 | 1 | 2.12 | 1 |
| 6.69 | 5 | 3.75 | 25 | 2.73 | 4 | 2.11 | 1 |
| 6.35 | 12 | 3.71 | 30 | 2.68 | 1 | 2.08 | 1 |
| 6.04 | 6 | 3.64 | 26 | 2.61 | 3 | 2.06 | 1 |
| 5.97 | 12 | 3.59 | 2 | 2.57 | 1 | 2.01 | 6 |
| 5.69 | 9 | 3.47 | 6 | 2.55 | 1 | 1.99 | 6 |
| 5.56 | 13 | 3.43 | 9 | 2.51 | 1 | 1.95 | 2 |
| 5.36 | 3 | 3.39 | 5 | 2.49 | 6 | 1.91 | 2 |
| 5.12 | 4 | 3.34 | 18 | 2.45 | 1 | 1.87 | 3 |
| 5.01 | 7 | 3.31 | 8 | 2.47 | 2 | 1.84 | 1 |
| 4.60 | 7 | 3.24 | 4 | 2.39 | 3 | 1.82 | 2 |
| 4.45 | 3 | 3.13 | 3 | 2.35 | 1 |  |  |

Zeolite ZSM-8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in United States 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range $SiO_2/Al_2O_3$—from about 10 to about 200
$Na_2O$/tetraethylammonium hydroxide—from about 0.05 to 0.20
Tetraethylammonium hydroxide/$SiO_2$—from about 0.08 to 1.0
$H_2O$/tetraethylammonium hydroxide—from about 80 to about 200

Thereafter, the crystals are separated from the liquid and recovered. Typical reaction conditions consist of heating the foregoing reaction mixture to a temperature of from about 100 °C. to 175° C. for a period of time of from about six hours to 60 days. A more preferred temperature range is from about 150 to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F., for from about 8 to 24 hours. Of course, milder conditions may be employed if desired, e.g., room temperature under vacuum.

ZSM-8 is prepared utilizing materials which supply the appropriate oxide. Such compositions include sodium aluminate, alumina, sodium silicate, silica hydrosol, silica gel, silicic acid, sodium hydroxide and tetraethylammonium hydroxide. It will be understood that each oxide component utilized in the reaction mixture can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by the bromide salt. The reaction mixture can be prepared either batchwise or continuously.

The zeolites used in the instant invention can have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including United States 3,140,249; United States 3,140,251; and United States 3,140,253.

Following contact with the salt solution of the desired replacing cation, the zeolites are then preferably washed with water and dried at a temperature ranging from 150° F. to about 600° F. and thereafter calcined in air or other inert gas at temperatures ranging from about 500° F. to 1500° F. for periods of time ranging from 1 to 48 hours or more. It has been further found in accordance with the invention that catalysts of improved selectivity and having other beneficial properties in some hydrocarbon conversion processes such as catalytic cracking are obtained by subjecting the zeolite to treatment with steam at elevated temperatures ranging from 800° F. to 1500° F. and preferably 1000° F. and 1400° F. The treatment may be accomplished in atmospheres of 100% steam of an atmosphere consisting of steam and a gas which is substantially inert to the zeolites.

A similar treatment can be accomplished at lower temperatures and elevated pressures, e.g., 350–700° F. at 10 to about 200 atmospheres. The zeolites can also be used in intimate combination with a hydrogenating component such as tungsten, vanadium, molybdenum, rhenium, nickel, cobalt, chromium, manganese, or a noble metal such as platinum or palladium where a hydrogenation/dehydrogenation function is to be performed, i.e., shape selective hydrocracking. Such component can be exchanged into the composition, impregnated therein or physically intimately admixed therewith. Such component can be impregnated in or onto zeolite such as, for example, by, in the case of platinum, treating the zeolite with a platinum metal-containing ion. Thus, suitable platinum compounds include chloroplatinic acid, platinous chloride and various compounds containing the platinum ammine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_3)_4Cl_2$ is particularly useful.

Prior to use, the zeolites should be dehydrated at least partially. This can be done by heating to a temperature in the range of 200 to 600° C. in an inert atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

As has heretofore been pointed out, the novel process of this invention is concerned with dewaxing of hydrocarbon feedstocks. The term "dewaxing" as used in the specification and claims is used in its broadest sense and is intended to mean the removal of those hydrocarbons which readily solidify (waxes) from petroleum stocks. As will be further illustrated in the specific examples, hydrocarbon feeds which can be treated include lubricating oil stocks as well as those which have a freeze point or pour point problem, i.e., petroleum stocks boiling above about 350° F. The dewaxing can be carried out at either cracking or hydrocracking conditions.

Typical cracking conditions include a liquid hourly space velocity between about 0.5 and 200, a temperature between about 550° F. and 1100° F., a pressure between about subatmospheric and several hundred atmospheres.

When hydrocracking operations are carried out, operating conditions include temperatures between 650° F. and 1000° F., a pressure between 100 and 3000 p.s.i.g. but preferably between 200 and 700 p.s.i.g. The liquid hourly space velocity is generally between 0.1 and 10, preferably between 0.5 and 4 and the hydrogen to hydrocarbon mole ratio is generally between 1 and 20 preferably between 4 and 12.

The following examples will illustrate the best mode now contemplated for carrying out this invention.

EXAMPLE 1

This example will illustrate a typical preparation of zeolite ZSM-5. 22.9 grams $SiO_2$ was partially dissolved in 100 ml. 2.18 N tetrapropylammonium hydroxide by heating to a temperature of about 100° C. There was then added a mixture of 3.19 grams $NaAlO_2$ (comp: 42.0 wt. percent $Al_2O_3$, 30.9% $Na_2O$, 27.1% $H_2O$) dissolved in 53.8 ml. $H_2O$. The resultant mixture had the following composition: 0.382 mole $SiO_2$, 0.0131 mole $Al_2O_3$, 0.0159 mole $Na_2O$, 0.118 mole $[(CH_3CH_2CH_2)_4N]_2O$, 6.30 moles $H_2O$. The mixture was placed in a Pyrex-lined autoclave and heated at 150° C. for six days. The resultant solid product was cooled to room temperature, removed, filtered, washed with 1 liter $H_2O$ and dried at 230° F. A portion of this product was subjected to X-ray analysis and identified as ZSM-5. A portion of the product was calcined at 1000° F. in air for 16 hours and the following analyses were obtained:

TABLE 5

| | |
|---|---|
| Wt. percent $SiO_2$ | 93.62 |
| Wt. percent $Al_2O_3$ | 4.9 |
| Wt. percent $Na_2O$ | 1.48 |
| Total | 100.00 |
| $SiO_2/Al_2O_3$ | 32.5 |
| $Na_2O/Al_2O_3$ | 0.5 |
| Wt. percent n-hexane adsorbed | 10.87 |
| Wt. percent cyclohexane adsorbed | 3.60 |
| Wt. percent $H_2O$ adsorbed | 9.15 |

EXAMPLE 2

A sample of a zeolite identified as ZSM-5 prepared in a manner analogous to that set forth in Example 1 was calcined at 1000° F. in air for 16 hours then evaluated for its ability to crack an Amal Gas Oil. The Amal Gas Oil employed was a 650–850° F. boiling range waxy Amal Gas Oil containing 25.2 weight percent normal paraffins ranging from $C_{-18}$'s to $C_{-38}$'s.

The Amal Gas Oil was contacted with the ZSM-5 at 107 WHSV, 0.56 Cat/Oil ratio and 900° F. Analysis indicated that the waxy normal paraffin content of the Amal Gas Oil had been reduced from 25.2 weight percent to 4.1 weight percent, i.e., over 90% of the normal paraffins present in the charge were cracked to lower boiling products.

EXAMPLE 3

The procedure of Example 2 was repeated with the exception that a commercially available zeolite, i.e., zeolite A, which had been base exchanged with a lanthanum salt was used in place of the ZSM-5. Even when more drastic operating conditions were employed, i.e., the space velocity was reduced to 6 WHSV and the Cat/Oil ratio raised to 1, the normal paraffin content could only be reduced to 16.5 weight percent.

Thus, a comparison of the results of Examples 2 and 3 shows that the novel process of this invention permits a greater reduction in high molecular weight waxy normal paraffins to a degree which had previously not been possible due to the fact that these long-chained molecules have a tendency to clog the pores of the heretofore available shape selective molecular sives, thereby presenting problems in diffusivity which leads to less than favorable results.

EXAMPLE 4

This example will illustrate the improved results which can be obtained by the hydrocarbon processing of the instant invention due to the fact that the catalyst employed are able to not only convert normal paraffins, but also slightly branched-chain paraffins—which are also detrimental to product value.

The same waxy Amal Gas Oil used in Example 2 was subjected to conventional extraction techniques utilizing a 5 A. zeolite. This extraction was continued until substantially all the normal paraffins from the Amal Gas Oil were removed. This is not a catalytic process, but merely a conventional extraction process. The Amal Gas Oil had a pour point of 100° F. and after removal of all the normal paraffins, its pour point was lowered to 40° F.

Another portion of the same waxy Amal Gas Oil was subjected to shape selective cracking with a ZSM-5 catalyst prepared in the manner analogous to that set forth in Example 1. The process was carried out at a temperature of 900° F. for 10 minutes at a space velocity of 107 WHSV and a Cat/Oil ratio of 0.56. This resulted in recovery of a 650+ fraction having a pour point of −5° F. with 3.6 weight percent of the normal paraffins still remaining.

Thus, it can be seen that although the lowering of pour point is dependent on the removal of normal paraffins, such is not the complete answer in pour point lowering. The novel process of this invention permits the drastic lowering of pour point even though all the normal paraffins have not been removed. While not wishing to be bound by any theory of operation, nevertheless, it appears that the novel catalyst of this invention also converts slightly branched paraffins which also have a detrimental effect on pour point.

EXAMPLE 5

A ZSM-5 zeolite was prepared in accordance to the general technique set forth in Example 1; it was then contacted with a saturated solution of ammonium chloride in order to replace the original cations associated therewith and thereafter washed with water, dried and calcined in air at about 1000° F. in order to convert it to the hydrogen form, i.e., H-ZSM-5.

A similar treatment with an ammonium salt was carried out on a natural crystalline aluminosilicate identified as erionite and then these two materials were evaluated for their ability to selectively crack normal hexane from a mixture of normal hexane, 2,3-dimethylbutane, and benzene at a 15:1 $H_2$/HC ratio, a pressure of 200 p.s.i. and a temperature of 700° F. These materials were evaluated for an onstream time of 15 minutes and three hours. The results were as follows:

| | Conversion, wt. percent | |
|---|---|---|
| Catalysts | 15 minutes | 3 hours |
| H-erionite | 93.8 | 33.7 |
| H-ZSM-5 | 97.9 | 97.8 |

The above table clearly and dramatically illustrates the truly remarkable and surprising results obtained utilizing the catalyst of the instant invention. Thus, at 15 minutes the conversion between the hydrogen erionite and H-ZSM-5 was substantially the same. This is not too surprising since both these materials are very active cracking catalysts. However, the results obtained after three hours are totally unexpected in that the H-ZSM-5 material did not age, i.e., lose activity, as is generally the case with all other zeolites. As can be seen, the conversion with erionite dropped to 33.7% thereby showing a definite aging whereas the conversion with H-ZSM-5 was substantially unchanged after three hours thereby illustrating the fact that the catalyst does not age.

EXAMPLE 6

In order to demonstrate the difference in the type of shape selectivity obtained utilizing the catalysts of this invention as opposed to the shape selective materials of the prior art, the same waxy Amal Gas Oil employed in Example 2 was subjected to shape selective cracking with a calcined sample of ZSM-5 prepared with a crystalline aluminosilicate identified as calcium A, i.e., Linde 5A. A comparison of the products obtained from cracking the same material are shown in Table 6.

TABLE 6

|  | ZSM-5, 52.4 wt. percent conversion | Calcium A, 8.2 wt. percent conversion | Δ 5A |
|---|---|---|---|
| $C_1$ | 0.8 | 1.2 | −0.4 |
| $C_2$ | 6.3 | 11.0 | −4.7 |
| $C_3$ | 27.1 | 20.8 | +6.3 |
| $C_4$ | 27.5 | 30.5 | −3.0 |
| $C_5$-$C_{12}$ ($C_5$-400° F.) | 37.3 | 19.5 | 17.8 |
| $C_{12}$-$C_{16}$ (400-600° F.) | Nil | Nil | ------ |
| Coke | 1.0 | 17.0 | −16.0 |

It is immediately obvious that the coke yield obtained by the novel process of this invention is dramatically lower than that obtained with a classic shape selective materials of the prior art. In addition the gasoline make, i.e., the $C_5$-$C_{12}$ is considerably higher than that with the Calcium A-type materials. Additionally, the classic shape selective catalyst of the prior art always yields products which are rich in $C_4$ hydrocarbons and conversely poorer in $C_5$-$C_{12}$ hydrocarbons. As can be seen, such is not the case utilizing the ZSM-5 type catalysts, thereby indicating that not only normal paraffins, but slightly branched-chain paraffins are also converted. The enhanced results are believed demonstrated by the above table.

The following examples will indicate that it is also possible to obtain improved results utilizing hydrogenation/dehydrogenation components in association with the ZSM-5 type catalysts.

EXAMPLE 7

A ZSM-5 type catalyst was prepared following the general procedure of Example 1. The reaction composition and characteristics of the finished product are shown in Table 7.

TABLE 7

| | |
|---|---|
| Temp., °C. | 150 |
| Time, days | 5 |
| Reaction composition: | |
| $SiO_2/Al_2O_3$ | 29.1 |
| $Na_2O/Al_2O_3$ | 1.19 |
| $TPA_2O/Al_2O_3$ | 9 |
| $H_2O/TPA_2O+Na_2O$ | 47 |
| Composition: | |
| $Na_2O$, wt. percent | 1.42 |
| Na, wt. percent | 1.8 |
| $Al_2O_3$, wt. percent | 6.1 |
| $SiO_2$, wt. percent | 90.6 |
| Total | 100.12 |
| $SiO_2/Al_2O_3$ | 25.2 |
| $Na_2O/Al_2O_3$ | 0.65 |
| Adsorption—cyclohexane, wt. percent | 3.07 |
| Normal hexane, wt. percent | 9.88 |
| $H_2O$, wt. percent | 7.51 |

The above material was then calcined at about 1000° F. for 16 hours and divided into two portions. Portion A was exchanged with 100 ml. of a 0.5 N aqueous solution of ammonium chloride at room temperature for one hour to form the ammonium salt. This was labeled Catalyst A1. Three grams of Catalyst A1 was exchanged with 35 ml. of a 0.5 N 2.9/1 zinc/$NH_4$ chloride solution at 109° F. for four hours. The material was then washed with water and dried in air to yield a catalyst having a zinc content of 0.9 weight percent and a sodium content of 0.2 weight percent. This catalyst was labeled A2.

Portion B was treated with anhydrous ammonia (100 cc. per minute) at room temperature to reconstitute the $NH_4$ sites. This catalyst was labeled B1. Three grams of Catalyst B1 was exchanged with a 0.5 N solution of zinc and ammonium chloride as above. The finished catalyst contained 1.2 weight percent zinc and 0.3 weight percent sodium and was labeled B2.

EXAMPLE 8

Catalyst B2 supra, was then evaluated for pour point reduction of shale oil by hydroprocessing techniques. The charge stock was a full range dehydrated shale oil having a pour point of about +80° F. A typical composition is shown in Table 8.

TABLE 8

| | Fraction, percent | | | | | | | |
|---|---|---|---|---|---|---|---|---|
| | 0-10 | 10-20 | 20-30 | 30-40 | 40-50 | 0-50 | 50-100 | 0-100 |
| Nonhydrocarbons, wt. percent: | | | | | | | | |
| N compounds | 12 | 14 | 21 | 26 | 33 | 21 | 51 | 36 |
| S compounds | 5 | 4 | 4 | 5 | 5 | 5 | 7 | 6 |
| O compounds | 12 | 17 | 18 | 17 | 16 | 16 | 22 | 19 |
| Total | 29 | 35 | 43 | 48 | 54 | 42 | 80 | 61 |
| Hydrocarbons, wt. percent: | | | | | | | | |
| n-Paraffins | 8 | 8 | 8 | 8 | 10 | 8 | 3 | 6 |
| Isoparaffins plus naphthenes | 7 | 6 | 4 | 3 | 3 | 5 | 5 | 5 |
| n-Olefins | 10 | 9 | 11 | 11 | 9 | 10 | 3 | 6 |
| Iso-olefins plus cyclo-olefins | 31 | 25 | 19 | 14 | 12 | 20 | 5 | 12 |
| Monocyclic aromatics | 6 | 8 | 6 | 6 | 5 | 6 | 2 | 4 |
| Polycyclic aromatics | 9 | 9 | 9 | 10 | 7 | 9 | 2 | 6 |
| Total | 71 | 65 | 57 | 52 | 46 | 58 | 20 | 39 |

The above shale oil was contacted with Catalyst B2 at 500 p.s.i.g., 4 LHSV, 800° F., and 2,000 s.c.f.s./bbl. hydrogen circulation. The results obtained showed a 97 weight percent recovery having a pour point of −15° F. An analysis of the liquid product having a −15° F. pour point showed that there was olefin saturation and a shift to lower boiling products resulting in increased naphtha and light fuel oil content with a corresponding decrease in the greater than $C_{22}$ range products, as shown by the following table.

| | Charge | $C_5$ plus liquid product |
|---|---|---|
| $C_5$ + naphtha | 10.0 | 15.4 |
| Light fuel oil | 16.9 | 18.2 |
| Higher products | 73.1 | 66.4 |

EXAMPLE 9

This example will illustrate the manufacture of lube oil by shape selective hydrodewaxing.

The lube oil charge stock employed had the following properties:

| | |
|---|---|
| Gravity, °API | 31.9 |
| Pour point, °F. | +85 |
| Sulfur, wt. percent | 0.17 |
| Hydrogen, wt. percent | 13.23 |
| K.V. @ 100° F., cs. | 19.27 |
| K.V. @ 210° F., cs. | 3.93 |
| Viscosity index | 108.4 |

Vacuum assay, °F.:
- IBP _____ 669
- 5% _____ 696
- 10% _____ 707
- 30% _____ 737
- 50% _____ 766
- 70% _____ 795
- 90% _____ 834
- 95% _____ 847

The above charge stock was subjected to hydrodewaxing with a zinc/H-ZSM-5 catalyst prepared in the manner set forth in Example 7 (B2), the experimental results as well as the various operating conditions are set forth in Table 9.

TABLE 9

| | | | | | |
|---|---|---|---|---|---|
| Temperature, °F | 700 | 700 | 650 | 650 | Charge |
| LHSV | 4 | 16 | 16 | 24 | |
| Pressure, p.s.i.g | 500 | 500 | 500 | 500 | |
| H/HC mole ratio | 38 | 38 | 38 | 38 | |
| Conv. wt. percent | 33 | 30.5 | 25.0 | 20.5 | |
| Hydrodewaxed lube: | | | | | |
| Yield, wt. percent | 67 | 69.5 | 75.0 | 79.5 | 100 |
| Pour point, °F | −40 | −20 | +25 | +40 | +85 |
| K.V. at 100° F | 31.18 | 29.55 | 22.18 | | 19.27 |
| K.V. at 210° F | 4.85 | 4.75 | 4.15 | | 3.93 |
| Viscosity index | 76.9 | 81.0 | 95.7 | | 108.4 |

From the above table, it can be seen that the instant catalyst resulted in a substantial lowering of a pour point from an original value of +85° to as low as −40° F.

The above results suggest that the novel catalytic processing of this invention can be employed in those areas where it is desirable to hydrodewax charge stocks in order to obtain products of enhanced value. One such area would be in the preparation of automatic transmission fluids. The above process can replace the conventional solvent dewaxing presently employed. As another alternative, it is visualized that a particular charge stock can be subjected to conventional solvent dewaxing in order to reduce the pour point to some intermediate level and then this product subjected to shape selective hydrodewaxing in order to further lower the pour point. As can be seen, the novel processing techniques of this invention give greater flexibility to the refiner in the manufacture of commercially significant products.

EXAMPLE 10

This example will illustrate the shape selective hydrodewaxing of lube oil stocks and will again illustrate that hydrocracking of long chain molecules can be achieved.

The charge stock employed was a mid-continent vacuum tower overhead fraction having the specifications shown in Table 10.

TABLE 10

Gravity, °API _____ 32.2
Gravity, specific _____ 0.8644
Vacuum assay, °F.:
- IBP _____ 550
- 5% _____ 596
- 10% _____ 630
- 30% _____ 646
- 50% _____ 662
- 70% _____ 684
- 90% _____ 728
- 95% _____ 756
Pour point, °F. (D-97) _____ +50
Flash point, °F. _____ 345
Viscosity:
- SUS, 100° F. _____ 57.7
- SUS, 130° F. _____ 45.8
- SUS, 210° F. _____ 34.5
- Kinematic, 100° F. _____ 10.56
- Kinematic, 210° F. _____ 2.50
Viscosity index _____ 56
Aniline No., °F. _____ 182.2

This charge stock was contacted with a Zn/H-ZSM-5 catalyst prepared in accordance with the techniques set forth in Example 7 (B2). The operating conditions were generally mild hydrocracking conditions, i.e., 500 p.s.i., 700° F., 4 LHSV and a hydrogen to hydrocarbon mol ratio of 30. The results obtained are shown in the following table.

Run time (hrs.) _____ 2
Conversion, wt. percent _____ 33.5
Yields, wt. percent:
- $C_1+C_2$ _____ 1.4
- $C_3$ _____ 5.4
- $C_4$ _____ 10.1
- $C_5$+cracked product _____ 16.6
- Unconverted _____ 66.5
Pour point, °F. of unconverted product _____ −85°

As can be seen from the above data, the novel process of this invention resulted in a substantial lowering of the pour point of the product, i.e., from +50° to −85° or a 4.5 F. lowering per percent conversion. Yield was 70 weight percent of the 600° F. plus liquid product. This example clearly indicates the improved results which are obtainable by the novel processing techniques of this invention.

EXAMPLE 11

This example will illustrate the preparation of a low freezing point high B.t.u. jet fuel prepared by the novel process of this invention.

A 350–500° F. Amal-Nafoora kerosene had the following properties:

Gravity, °API _____ 48.1
Freeze point, °F. _____ −27
Aromatics (FIA) vol. percent _____ 9.1
Aniline No., °F. _____ 156.9
Heating value, B.t.u./lb. _____ 18,710

This charge stock was contacted with a Zn/H-ZSM-5 catalyst prepared in accordance with the techniques set forth in Example 7(B2). The operating conditions were 500 p.s.i.g. 650° F., 24 LHSV, 15/1 mole ratio $H_2$/HC. The above procedure resulted in a 78.5% yield of a dewaxed product whose properties, together with those of a JP-7 jet fuel, are shown in Table 11.

TABLE 11

| | | |
|---|---|---|
| Gravity, °API | 47.2 | 44–50 |
| Freeze Point, °F | −63 | −50 |
| Aromatics (FIA) vol. percent | 11.9 | 5 |
| Aniline No., °F | 148.9 | |
| Heating value, B.t.u./lb | 18,655 | 18,750 |

The results shown in the above table illustrate the fact that the novel process of this invention is capable of significantly lowering the freeze point of an Amal kerosene. It is noted, however, that the heating value and aromatic content of the product fall outside the specification for JP-7 jet fuel.

In order to raise the heating value and lower the aromatic content, the hydrodewaxed product can be subjected to a mild hydrogenation treatment. In this connection 20 grams of the hydrodewaxed product, 100 ml. of cyclohexane, 11 grams of a commercial catalyst comprising reduced nickel or Kieselguhr (Harshaw Ni 0107) were charged to a 300 ml. stirring autoclave and 500 p.s.i.g. hydrogen was added. The above mixture was heated at 587–600° F. about 2 hours at which time the final pressure was about 1200–1300 p.s.i.g. The above procedure resulted in a 93 wt. percent recovery of a hydrogenated product which had the properties shown in Table 12.

TABLE 12

| | |
|---|---|
| Gravity, ° APA | 47.5 |
| Freeze point, ° F. | −81 |
| Aromatics (FIA) vol. percent | 4.0 |
| Aniline No., ° F. | 179.0 |
| Heating value, B.t.u./lb. | 18,835 |

From the above, it can be seen that the novel process of this invention provides a method of producing jet fuels having a low freeze point and a high B.t.u. content.

What is claimed is:

1. A dewaxing process for the selective cracking of straight-chain hydrocarbons and slightly branched-chain hydrocarbons from a mixture of the same with compounds of different molecular shapes which comprises contacting said mixture with a crystalline aluminosilicate having an X-ray diffraction pattern as set forth in Table 1 and having more openings which are of a generally elliptical shape wherein the major axis of said ellipse has an effective size under conversion conditions of between about 6 and 9A. units and the minor axis about 5 A. so that said straight-chain and slightly branched-chain hydrocarbons are capable of entering into the internal pore structure of the aluminosilicate and being converted, said aluminosilicate having a composition, in terms of oxide mole ratios, as follows:

$$0.9 \pm 0.2\ M_{2/n}O:Al_2O_3:5\text{--}100\ SiO_2:zH_2O$$

wherein M is a cation, $n$ is the valence of said cation and $z$ is from 0 to 40.

2. The process of claim 1 wherein said slightly branched hydrocarbon does not possess a quaternary carbon atom.

3. The process of claim 1 wherein said aluminosilicate has a hydrogenation/dehydrogenation function.

4. A process for dewaxing petroleum charge stocks having a boiling point above 350° F. which comprises contacting said charge under cracking conditions with a crystalline aluminosilicate having an X-ray diffraction pattern set forth in Table 1 so as to selectively crack straight-chain hydrocarbons and branched-chain hydrocarbons free from quaternary carbon atoms in their structure, said aluminosilicate having a composition, in terms of oxide mole ratios, as follows:

$$0.9 \pm 0.2\ M_{2/n}O:Al_2O_3:5\text{--}100\ SiO_2:zH_2O$$

wherein M is a cation, $n$ is the valence of said cation, and $z$ is from 0 to 40.

5. A dewaxing process for the selective cracking of straight-chain hydrocarbons and branched-chain hydrocarbons which are free from quaternary carbon atoms in their structure from a mixture of the same with cyclic compounds, and branched-chain hydrocarbons containing quaternary carbon atoms which comprises contacting said mixture with a crystalline aluminosilicate having an X-ray diffraction pattern set forth in Table 1, and a composition, in terms of oxide mole ratios, as follows:

$$0.9 \pm 0.2\ M_{2/n}O:Al_2O_3:5\text{--}100\ SiO_2:zH_2O$$

wherein M is a cation, $n$ is the valence of said cation and $z$ is from 0 to 40.

6. A dewaxing process for the selective conversion of straight-chain hydrocarbons and branched-chain hydrocarbons free from quaternary carbon atoms from a mixture of the same with compounds of differing molecular shape which comprises contacting the same with zeolite ZSM-5 under cracking conditions such that the straight-chain hydrocarbons and slightly branched hydrocarbons are able to enter into the pores of the ZSM-5 and be cracked, said zeolite having an X-ray diffraction pattern as set forth in Table 1 and a composition, in terms of oxide mole ratios, as follows:

$$0.9 \pm 0.2\ M_{2/n}O:Al_2O_3:5\text{--}100\ SiO_2:zH_2O$$

wherein M is a cation, $n$ is the valence of said cation, and $z$ is from 0 to 40.

7. A dewaxing process for the selective conversion of straight-chain hydrocarbons and branched-chain hydrocarbon free from quaternary carbon atoms from a mixture of the same with compounds of differing molecular shape which comprises contacting the same with zeolite ZSM-8 under conversion conditions such that the straight-chain hydrocarbons and slightly branched hydrocarbons are able to enter into the pores of the ZSM-8 and be cracked, said zeolite having an X-ray diffraction pattern as set forth in Table 4 and a composition, in terms of oxide mole ratios, as follows:

$$0.9 \pm 0.2\ M_{2/n}O:Al_2O_3:5\text{--}100\ SiO_2:zH_2O$$

wherein M is a cation, $n$ is the valence of said cation, and $z$ is from 0 to 40.

8. The process of claim 5 wherein the dewaxing is carried out in the presence of added hydrogen and the aluminosilicate has a hydrogen/dehydrogenation component associated therewith.

9. The process of claim 6 wherein the dewaxing is carried out in the presence of added hydrogen and the aluminosilicate has a hydrogenation/dehydrogenation component associated therewith.

10. The process of claim 7 wherein the dewaxing is carried out in the presence of added hydrogen and the zeolite has a hydrogenation/dehydrogenation component associated therewith.

11. The process of claim 4 wherein the dewaxing is carried out in the presence of added hydrogen and the aluminosilicate has a hydrogenation/dehydrogenation component associated therewith.

References Cited

UNITED STATES PATENTS

| | | | |
|---|---|---|---|
| 3,438,887 | 4/1969 | Morris et al. | 208—87 |
| 3,385,781 | 5/1968 | Hamner et al. | 208—59 |
| 3,575,846 | 4/1971 | Hamner et al. | 208—111 |
| 3,492,218 | 1/1970 | Collier et al. | 208—27 |
| 3,516,925 | 6/1970 | Lawrance et al. | 208—111 |
| 3,539,498 | 11/1970 | Morris et al. | 208—111 |

FOREIGN PATENTS

| | | | |
|---|---|---|---|
| 1,167,869 | 10/1969 | Great Britain | 208—27 |

DELBERT E. GANTZ, Primary Examiner

G. E. SCHMITKONS, Assistant Examiner

U.S. Cl. X.R.

208—120; 252—455 Z

PO-1050
(5/69)

UNITED STATES PATENT OFFICE
CERTIFICATE OF CORRECTION

Patent No. 3,700,585      Dated October 24, 1972

Inventor(s) Nai Yuen Chen, Stanley J. Lucki and William E. Garwood

It is certified that error appears in the above-identified patent and that said Letters Patent are hereby corrected as shown below:

Column 1, line 23,    "freezing," should be --freezing point,--.

Column 3, line 46,    " "keynote." " should be --"keyhole".--.

Column 11, line 59,    "$Na_2O/Al_3O_3$" should be --$Na_2O/Al_2O_3$--.

Column 11, line 64,    "1.42" should be --2.42--.

Column 15, line 18,    "more" should be --pore--.

Signed and sealed this 17th day of April 1973.

(SEAL)
Attest:

EDWARD M. FLETCHER, JR.            ROBERT GOTTSCHALK
Attesting Officer                  Commissioner of Patents